(12) United States Patent
Flores et al.

(10) Patent No.: US 11,893,457 B2
(45) Date of Patent: Feb. 6, 2024

(54) INTEGRATING SIMULATED AND REAL-WORLD DATA TO IMPROVE MACHINE LEARNING MODELS

(71) Applicant: International Business Machines Corporation, Armonk, NY (US)

(72) Inventors: German H Flores, San Jose, CA (US); Mu Qiao, Belmont, CA (US); Divyesh Jadav, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 758 days.

(21) Appl. No.: 16/743,417

(22) Filed: Jan. 15, 2020

(65) Prior Publication Data
US 2021/0216906 A1  Jul. 15, 2021

(51) Int. Cl.
*G06N 20/00* (2019.01)
*G06N 5/04* (2023.01)
*G01N 30/86* (2006.01)

(52) U.S. Cl.
CPC .............. *G06N 20/00* (2019.01); *G01N 30/86* (2013.01); *G06N 5/04* (2013.01)

(58) Field of Classification Search
CPC .......... G06N 20/00; G06N 5/04; G01N 30/86; G06Q 10/067; G06Q 50/30; G06Q 90/20; G01F 1/8436
See application file for complete search history.

(56) References Cited

U.S. PATENT DOCUMENTS

| 2012/0176497 | A1 | 7/2012 | Shadmi | |
| 2017/0082723 | A1* | 3/2017 | Pajovic | G01S 5/02 |
| 2018/0349527 | A1* | 12/2018 | Li | B25J 9/161 |
| 2019/0065933 | A1* | 2/2019 | Bogdoll | G06N 3/04 |
| 2019/0204842 | A1 | 7/2019 | Jafari Tafti et al. | |

(Continued)

FOREIGN PATENT DOCUMENTS

| CN | 103645635 A | 3/2014 |
| CN | 107256307 A | 10/2017 |

(Continued)

OTHER PUBLICATIONS

Flores, "An iBeacon Training App for Indoor Fingerprinting", 2017 5th IEEE International Conference on Mobile Cloud Computing, Services, and Engineering. (Previously supplied). (Year: 2017).*

(Continued)

*Primary Examiner* — Dave Misir
(74) *Attorney, Agent, or Firm* — Patterson + Sheridan, LLP (57) ABSTRACT

Techniques for data integration and labeling are provided. Training real-world signal data is collected for a physical environment, where the training real-world signal data comprises at least one of (i) coordinate information or (ii) a direction to move. Simulated signal data is generated for a first portion of the physical environment, and an aggregate data set is generated comprising the training real-world signal data and the simulated signal data. A machine learning (ML) model is trained using the aggregate data set. A first real-world data point is received, where the first real-world data point does not include coordinate information, and the first real-world data point is labeled based at least in part on coordinate information of the aggregate data set.

12 Claims, 6 Drawing Sheets

(56) References Cited

U.S. PATENT DOCUMENTS

| | | | | |
|---|---|---|---|---|
| 2019/0205667 A1* | 7/2019 | Avidan | ............. | G06V 10/82 |
| 2020/0103232 A1* | 4/2020 | Chan | ............. | G01C 21/206 |
| 2021/0073345 A1* | 3/2021 | St. Romain, II | ........ | G06F 30/27 |

FOREIGN PATENT DOCUMENTS

| | | |
|---|---|---|
| CN | 107687847 A | 2/2018 |
| CN | 108469815 A | 8/2018 |
| CN | 109086550 A | 12/2018 |
| WO | 2018101549 A1 | 6/2018 |

OTHER PUBLICATIONS

Budina, "Method of iBeacon Optimal Distribution for Indoor Localization", LNAI 9405, pp. 105-117, 2015. (Previously supplied). (Year: 2015).*

Alhmiedat, "An Indoor Fingerprinting Localization Approach for ZigBee Wireless Sensor Networks", European Journal of Scientific Research, vol. 105 No. 2 Jul. 2013, pp. 190-202. (Previously supplied). (Year: 2013).*

Sinha, "Data Augmentation Schemes for Deep Learning in an Indoor Positioning Application", Electronics 2019, 8, 554. (Previously supplied). (Year: 2019).*

Rizk, "CellinDeep: Robust and Accurate Cellular-Based Indoor Localization via Deep Learning", IEEE Sensors Journal, vol. 19, No. 6, Mar. 15, 2019. (Previously supplied). (Year: 2019).*

Rizk, "Effectiveness of Data Augmentation in Cellular-based Localization Using Deep Learning", 2019 IEEE Wireless Communications and Networking Conference. (Previously supplied). (Year: 2019).*

Kriz, "Improving Indoor Localization Using Bluetooth Low Energy Beacons", Mobile Information Systems, vol. 2016. (Previously supplied). (Year: 2016).*

Botta, Miroslav, and Milan Simek. "Adaptive distance estimation based on RSSI in 802.15.4 network." Radioengineering 22.4 (2013): 1162-1168.

Ross, Stephane, Geoffrey Gordon, and Drew Bagnell. "A reduction of imitation learning and structured prediction to no-regret online learning." Proceedings of the fourteenth international conference on artificial intelligence and statistics. 2011.

Karras, Tero, et al. "Progressive growing of GANs for improved quality, stability, and variation." arXiv preprint arXiv:1710.10196 (2017).

Budina, Jan, et al. "Method of iBeacon optimal distribution for indoor localization." International and Interdisciplinary Conference on Modeling and Using Context. Springer International Publishing, 2015. [Abstract Only].

Gregor, Karol, et al. "Draw: A recurrent neural network for image generation." arXiv preprint arXiv:1502.04623 (2015).

Hernndez-Garca, Alex, and Peter Knig. "Do deep nets really need weight decay and dropout?." arXiv preprint arXiv:1802.07042 (2018).

Alhmiedat, Tareq, Ghassan Samara, and Amer O. Abu Salem. "An indoor fingerprinting localization approach for ZigBee wireless sensor networks." arXiv preprint arXiv:1308.1809 (2013).

Daftry, Shreyansh, J. Andrew Bagnell, and Martial Hebert. "Learning transferable policies for monocular reactive mav control." International Symposium on Experimental Robotics. Springer, Cham, 2016.

Kang, Katie, et al. "Generalization through Simulation: Integrating Simulated and Real Data into Deep Reinforcement Learning for Vision-Based Autonomous Flight." arXiv preprint arXiv:1902.03701 (2019).

Flores, German H., Thomas D. Griffin, and Divyesh Jadav. "An iBeacon Training App for Indoor Fingerprinting." 2017 5th IEEE International Conference on Mobile Cloud Computing, Services, and Engineering (MobileCloud). IEEE, 2017. [Abstract Only].

* cited by examiner

INTEGRATING SIMULATED AND REAL-WORLD DATA TO IMPROVE MACHINE LEARNING MODELS

BACKGROUND

The present disclosure relates to machine learning, and more specifically, to integrating and aggregating real-world and simulated data to improve machine learning models.

Machine learning (ML) models can be used extensively in a wide range of applications, including image classification, anomaly detection, and automation. In order for these models to be effective and trustworthy, their accuracy must be high even in adverse situations. The amount and quality of labeled data that is used to train these models therefore needs to be quite large in order to ensure proper training of the model. If the data is scarce, more data needs to be collected, at the expense of allocating extra time and resources for the collection and labeling process. This data collection can quickly become cost or time prohibitive. However, without sufficient real-world data, which includes a wide variety of unpredictable nuances, accurate and reliable models cannot be built.

SUMMARY

According to one embodiment of the present disclosure, a method is provided. The method includes collecting training real-world signal data for a physical environment, wherein the training real-world signal data comprises at least one of (i) coordinate information or (ii) a direction to move, and generating simulated signal data for a first portion of the physical environment. The method further includes generating an aggregate data set comprising the training real-world signal data and the simulated signal data, and training a machine learning (ML) model using the aggregate data set. Additionally, the method includes receiving a first real-world data point, wherein the first real-world data point does not include coordinate information, and labeling the first real-world data point based at least in part on coordinate information of the aggregate data set. Advantageously, the method produces improved ML models by using integrated and aggregate sets of data, and by labeling newly-received data automatically.

According to another embodiment of the present disclosure, generating the aggregate data set comprises labeling the simulated signal data based at least in part on the coordinate information of the training real-world signal data. Advantageously, this allows the simulated data to be automatically labeled and integrated, without requiring manual curation. This improves the model without requiring additional labor or cost.

According to still another embodiment of the present disclosure, generating the simulated signal data comprises computing predicted signal values using one or more path loss models that predict signal characteristics of sensing devices. An advantage of such an embodiment is that additional training data can be simulated using accurate models, without requiring additional cost or time expenditures.

According to another embodiment of the present disclosure, the method further includes identifying the first portion of the physical environment by selecting a subset of the training real-world signal data that was collected in the first portion of the physical environment, and generating the simulated signal data for the first portion based on determining that the subset of the training real-world signal data fails to meet one or more predefined criteria. Advantageously, such an embodiment enables the system to generate simulated data for regions in which it is likely to be accurate and useful, while refraining from doing so in areas that it is likely to be useless or counterproductive.

According to some embodiments of the present disclosure, the one or more predefined criteria comprise (i) a minimum number of beacons reflected in the subset of the training real-world signal data, and (ii) a minimum average signal strength reflected in the subset of the training real-world signal data. An advantage of this embodiment is that the quality of the signal is evaluated using objective and reliable criteria to ensure adequate functionality of the system.

According to another embodiment of the present disclosure, labeling the first real-world data point comprises: identifying a similar data point in the aggregate data set, based on signal strength information included in the aggregate data set and the first real-world data point, and determining a coordinate indicated by the similar data point, wherein the labeled first real-world data point is added to the aggregate data set. Advantageously, such an embodiment enables the system to automatically label new data using the prior data, which enables significant expansion of the models without requiring additional time and cost expenditures.

According to still another embodiment of the present disclosure, the first real-world data point is received at runtime, and the method further includes generating a next direction by evaluating the first real-world data point using the trained ML model, and returning the next direction to a device that transmitted the first real-world data point. Advantageously, this allows the system to guide users with the proper next action, based on prior training.

According to a different embodiment of the present disclosure, any combination of the above-discussed embodiments can be implemented by one or more computer-readable storage media. The computer-readable storage media collectively contain computer program code that, when executed by operation of one or more computer processors, performs an operation. In embodiments, the operation performed can correspond to any combination of the above methods and embodiments.

According to yet another different embodiment of the present disclosure, any combination of the above-discussed embodiments can be implemented by a system. The system includes one or more computer processors, and one or more memories collectively containing a program which, when executed by the one or more computer processors, performs an operation. In embodiments, the operation performed can correspond to any combination of the above methods and embodiments.

DETAILED DESCRIPTION

Embodiments of the present disclosure provide techniques to integrate and aggregate simulated and real-world data to improve the robustness of trained models, while reducing the time and costs required to prepare and collect training data. Synthetic data (data obtained by indirect measurements) can be generated from the real-world data or from simulated data using one or more models. In existing systems, the intrinsic properties of the real-world data are typically not often reflected in simulated or generated data. This leads to generating non-realistic data, which leads to models that are frequently not representative of the properties being measured/evaluated. In order to avoid this residual effect, embodiments of the present disclosure provide techniques for integrating real-world data with simulated data.

In at least one embodiment, simulated data is used to capture the characteristics observed under ideal, noise-free conditions, while real-world data captures the characteristics in noisy, high interference environments. Machine learning methods are then used to take advantage of this integration in order to improve the model's accuracy, while at the same time reducing the costs and time associated with data collection. In embodiments, generating simulated data reduces the amount of time that is required to collect large amounts of real-world data. Although the embodiments disclosed herein can be used across a wide number of machine learning methods and applications, some examples included herein discuss an imitation learning technique with the goal to improve and provide assisted indoor/outdoor navigation. The present disclosure is not limited to these examples, which are included for conceptual clarity.

In one embodiment, a cognitive system is used to integrate simulated and real-world data in order to reduce the time and costs needed to perform data collection and labeling, and the simulated and real-world data are used in an imitation learning algorithm to improve the learning process and automate the labeling of new data. Additionally, in one embodiment, the system facilitates the correction of any mislabeled data. These components expedite and reduce the overall costs incurred when additional data acquisition is required.

In some embodiments, an administrator or expert walks the physical space collecting radio signatures such as received signal strength indicators (RSSIs) at pre-determined locations, and each reading is annotated with the coordinates (e.g., an (X,Y) location) where the reading was collected. These readings can be used for localization by comparing current readings with the ones collected during the initial/training phase. In an embodiment, "localization" refers to the process of determining, estimating, predicting, or otherwise identifying the location of a user or user device. To facilitate the process of data collection, in some embodiments, tools are used to display a map on a device and allow a user to select the regions in the map at which to collect readings.

In one embodiment, integrating simulated and real-world sensor data can minimize the time and resources required to collect training data, enable automation of part of the process to label the training data, and aggregate labeled training data overtime to build a more-comprehensive training set. In one example embodiment, the comprehensive training set assembled can be used to improve indoor/outdoor assisted navigation in real-time (e.g., for blind users, or anyone who wishes to receive navigational information as they traverse a physical space).

For outdoor localization and navigation, typical navigation systems use GPS-enabled devices to determine an approximate location of a sensing device, such as smart phone or tablet. However, GPS does not work well in indoor environments due to the interference caused by cement walls and metal structure of buildings or other nearby structures. In some embodiments, indoor navigation systems can rely on other sensors, such as RFID tags or beacons, to provide the information needed to do two-dimensional or three-dimensional localization or proximity detection. In one embodiment of the present disclosure, systems are provided to use beacons or similar devices to get the information needed to build a labeled "signature" map of the indoor or outdoor environment. The information in this "signature" map, referred to in some embodiments as trajectory data, consists of the information received from these beacons, such as RSSI. In some embodiments, the information further includes other pertinent information, such as the orientation of a sensing device with respect to a reference system.

In at least one embodiment, after real-world sensor data is collected, it is analyzed to extract meaningful insights about the data (such as the quality of the data at various points in the space). Simulated data can then be generated based on the evaluation of the real-world data. In at least one embodiment, the system can further recommend areas in which to collect additional real-world data. The system can then, in some embodiments, aggregate and label additional training data, as well as aid correction of any mislabeled data. In one embodiment, the real-world data consists of the received signal strength between one or more transmitters and a sensing device, the direction the sensing device was facing as the signals from the transmitters were collected, and the coordinates of where these measurements were taken within the indoor/outdoor space. Given a map of the environment where transmitters, such as beacons, have been deployed, real-world trajectory data can be collected by walking accessible places of interest, such as hallways or open spaces, with a sensing device that is listening for these beacons.

In an embodiment, once the real-world trajectory data has been collected, it can be processed and analyzed to learn different characteristics of the beacons and environment, such as the quality of the signals, in order to determine portions of the space where the signal is strong and/or weak (e.g., due to presence of obstacles or other interfering factors). This analysis can enable further collection of additional real-world data in those areas with high signal interference (weak signal strength), as well as generate additional simulated data in those areas with low signal interference (strong signal strength). In embodiments, the selective use of simulated data for "high quality" portions of the region can improve data modeling because existing simulation models tend to behave well under ideal conditions (where little noise or bias is present), even if they are inadequate in other areas with higher interference or weaker signals.

In embodiments, the real-world and simulated data is integrated into a single set, referred to herein as the training set or expert policy, which can be used to train a model and/or aid in farther data collections. In some embodiments, this training set is used to further aggregate and label additional data during runtime. This additional data consists of real-world data relating to information received by the beacons, without corresponding coordinates and/or orientation of the sensing device. In at least one embodiment, imitation learning and K-nearest neighbor algorithms can be applied to label this additional data (e.g., with coordinates and/or orientation) given the previously generated training set. In some embodiments, the imitation learning techniques are used to determine an orientation that best mimics the real-world data given the expert policy (training set) in place, while the K-nearest neighbor algorithms are used to find the closest trajectory match within the training set that best matches the new data. The coordinates of this closest match, and/or orientation of this closest match, can then be used to label the new data.

Stated differently, in some embodiments, the existing training set/expert policy are used to label additional data without having to rely on an expert user and/or the tedious process of collecting training data and labeling it manually. In one embodiment, an expert user is initially used to collect real-world sensor data, and the system analyzes the real-world data, generates simulated data, and recommends areas in which to collect additional real-world data. In some embodiments, thereafter, there is no need to have an expert user who oversees the training data collection process. In such an embodiment, as users walk the same indoor/outdoor space, new data is collected by their devices and labeled automatically, without requiring manual review. Furthermore, as more data is collected, the training set/expert policy can be continuously augmented, thus creating a training set/expert policy that is comprehensive.

In some embodiments, if new data is mislabeled, (e.g., when the classification algorithm fails to predict properly, or there is interference not previously seen), a correction tool is provided to remedy these mislabels. The correction tool can intuitively display the training data and interactively allow (expert) users to relabel the data. This automatic labeling and integration of simulated and real-world data reduces the high cost and time associated with data collection and labeling.

Figure 1:
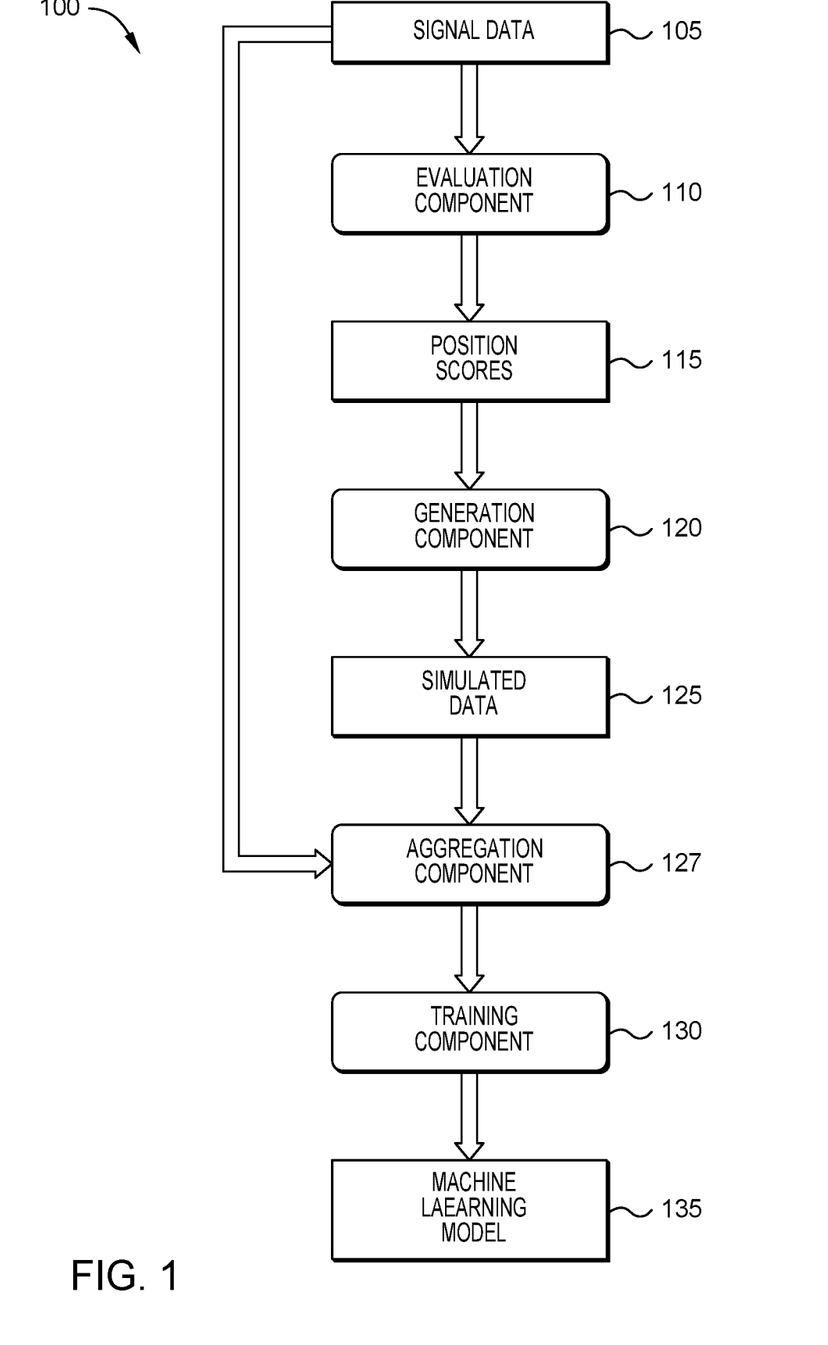
FIG. 1 depicts a workflow for integrating real-world data and simulated data to improve data models, according to one embodiment disclosed herein.

FIG. 1 depicts a workflow 100 for integrating real-world data and simulated data to improve data models, according to one embodiment disclosed herein. In the illustrated workflow 100, Signal Data 105 is collected and provided to an Evaluation Component 110. The Signal Data 105 generally corresponds to collected real-world data. In one embodiment, the Signal Data 105 includes a set of data points or records, where each data point indicates the coordinates and/or orientation of a sensing device at a moment in time, as well as information received at the location from one or more beacon devices (e.g., an RSSI for each beacon that is accessible or detectable by the sensing device, at the location). For example, the Signal Data 105 may be collected using a sensing device that records RSSIs and identifying information from a set of beacons while a user moves around a physical space.

In the illustrated embodiment, the Evaluation Component 110 evaluates and analyzes the real-world Signal Data 105 to identify strong and weak regions, portions, positions, or locations in the physical space. In one embodiment, this includes generating position or region scores based on the perceived signals at each location indicated in the Signal Data 105. For example, the Evaluation Component 110 can identify portions of the space with strong signals, portions with weak or unusable signals, and/or portions with ordinary/acceptable signals. In one embodiment, the quality of the signal (and thus the score of the region) is determined based on a variety of factors, such as the number of beacons detected at the position, the magnitude/strength of the received signals, the variance of the signal strength, and the like.

For example, a position may be scored as having strong signals if the Signal Data 105 includes signals with a predefined minimum RSSI from a predefined minimum number of beacons. Further, in one embodiment, the score of the position is further based on how the RSSI from the one or more beacons changes or varies over time (e.g., while the user stands in the position, or when the user leaves and returns to the position). If the variance exceeds a threshold, the Evaluation Component 110 can determine that the location has weak signals. In one embodiment, position with scores exceeding a predefined threshold are classified as "strong," while positions with scores below a second predefined threshold are classified as "weak." In one such embodiment, simulated data can be generated for locations with "strong" signals, while additional data is collected in positions with "weak" signals. Further, in embodiments that include an "ordinary" or acceptable signal definition, the system can refrain from taking further action with respect to such locations. That is, the system will not request additional data be collected (e.g., because the area's signal is sufficient) but will also not generate simulated data for the region (e.g., because the signal quality is not sufficiently high to assure that simulated data would be accurate).

In the illustrated embodiment, the Evaluation Component 110 generates Position Scores 115 indicating the signal quality at one or more locations in the physical space. These Position Scores 115 are then provided to a Generation Component 120, which generates Simulated Data 125 for portions of the space that qualify as "good" or "strong." In one embodiment, the Generation Component 120 does so by using a path loss model, propagation model, the inverse square law, or any other techniques used to predict signal characteristics at various points or distances. For example, given the known location of each beacon, the Generation Component 120 can estimate or predict the received signal strength from each beacon at any given point in the space using a path loss model.

In one embodiment, the Generation Component 120 computes, for each high quality or strong signal location, predicted signal information from the beacons. In one embodiment, the Generation Component 120 then labels this newly generated data with the coordinates of the location, and/or the orientation of the sensing device (e.g., copied from the real-world Signal Data 105). This Simulated Data 125 and Signal Data 105 are then aggregated by an Aggregation Component 127, and the aggregated data is provided to the Training Component 130. The Training Component 130 uses the aggregated data to generate and train one or more ML Models 135, as discussed in more detail below. Advantageously, this improves the quality of the models while reducing the cost and time required to collect and label training data.

Figure 2:
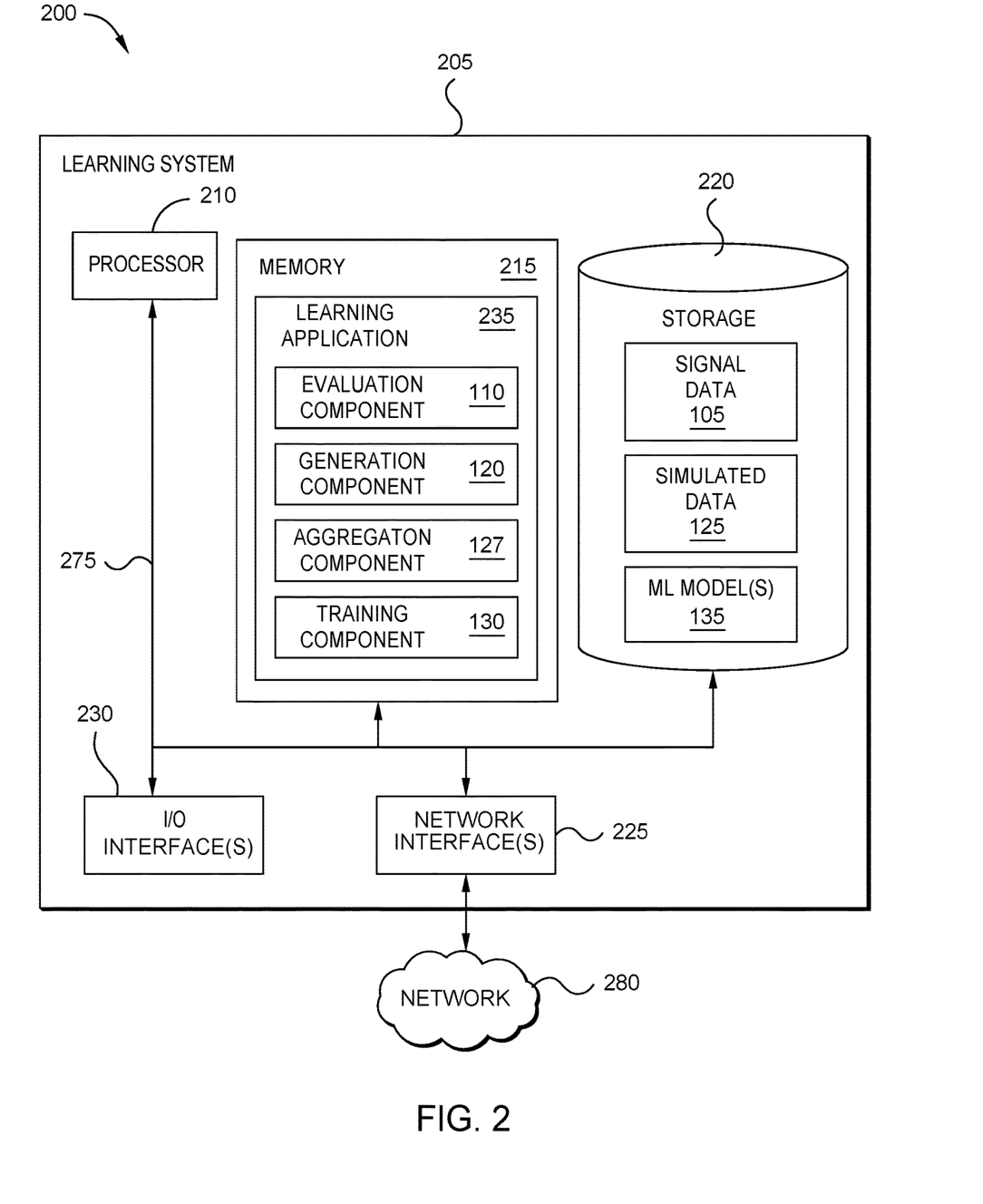
FIG. 2 is a block diagram illustrating a learning system configured to integrate real-world and simulated data, according to one embodiment disclosed herein.

FIG. 2 is a block diagram 200 illustrating a Learning System 205 configured to integrate real-world and simulated data, according to one embodiment disclosed herein. Although depicted as a physical device, in embodiments, the Learning System 205 may be implemented using virtual device(s), and/or across a number of devices (e.g., in a cloud environment). As illustrated, the Learning System 205 includes a Processor 210, Memory 215, Storage 220, a Network Interface(s) 225, and one or more I/O Interfaces 230. In the illustrated embodiment, the Processor 210 retrieves and executes programming instructions stored in Memory 215, as well as stores and retrieves application data residing in Storage 220. The Processor 210 is generally representative of a single CPU and/or GPU, multiple CPUs and/or GPUs, a single CPU and/or GPU having multiple processing cores, and the like. The Memory 215 is generally included to be representative of a random access memory. Storage 220 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, input and output devices (such as keyboards, monitors, etc.) are connected via the I/O Interface(s) 230. Further, via the Network Interface(s) 225, the Learning System 205 can be communicatively coupled with one or more other devices and components (e.g., via the Network 280, which may include the Internet, local network(s), and the like). As illustrated, the Processor 210, Memory 215, Storage 220, Network Interface(s) 225, and I/O Interface(s) 230 are communicatively coupled by one or more Buses 275.

In the illustrated embodiment, the Storage 220 includes Signal Data 105, Simulated Data 125, and one or more ML Models 135. The Signal Data 105 generally includes real-world data collected in one or more physical spaces. For example, the Signal Data 105 may include, for one or more locations, positions, or regions in a space, an indication of the perceived signal strength from one or more beacons in the space. The Simulated Data 125 is generated to mimic real-world data for one or more positions in the physical space. For example, the Simulated Data 125 can be generated by computing an estimated signal strength from one or more beacons at a given point in the space. In one embodiment, the Simulated Data 125 is only generated for regions of the space with sufficient signal quality (e.g., as indicated in the Signal Data 105).

The ML Model(s) 135 can include any number of trained models. In one embodiment, a first ML Model 135 is trained to receive signal data (e.g., a list of the currently-visible beacons, and the signal strength of each) from user devices, and predict a current location and/or orientation of the user device. In some embodiments, the ML Models 135 further generate a recommended or suggested action, such as a direction to move. That is, one or more models can be trained to instruct the user how to move from their current location to a target destination (e.g., to the check-in desk from the building entrance), based on their current coordinates, orientation, and/or perceived signals.

As illustrated, the Memory 215 includes a Learning Application 235. Although depicted as software residing in Memory 215, in embodiments, the functionality of the Learning Application 235 can be implemented using hardware, software, or a combination of hardware and software. The Learning Application 235 includes an Evaluation Component 110, Generation Component 120, an Aggregation Component 127, and a Training Component 130. Although depicted as discrete components for conceptual clarity, in embodiments, the operations can be combined or distributed across any number of components.

As discussed above, the Evaluation Component 110 generally receives real-world Signal Data 105 and evaluates it using predefined criteria to determine the signal quality for various positions or locations in the physical space. In one embodiment, this includes determining, for a given location, the number of beacons that provide sufficiently strong signal strength (compared to a predefined minimum strength). In another embodiment, the Evaluation Component 110 further determines the variance of the signal strength at the position (e.g., the amount that the signal strength appears to increase and decrease over time). In one embodiment, based on this evaluation, the Evaluation Component 110 generates a score for each region or location, indicating the signal quality at that location.

The Generation Component 120 is used to generate, for one or more portions or regions of the space, Simulated Data 125. In one embodiment, the Generation Component 120 generates Simulated Data 125 for each region having a predefined minimum signal quality score. That is, in such an embodiment, the Generation Component 120 only generates data for regions of the environment that have sufficiently high-quality signal. In some embodiments, the Generation Component 120 uses one or more path loss models to compute signal information for a given location in the space. That is, the Generation Component 120 uses one or more models or algorithms that predict signal characteristics (e.g., received signal strength) at a given location, based on known characteristics of the beacons (e.g., their locations, output strength, transmission frequency, and the like). In an embodiment, the Generation Component 120 then labels this synthetic signal data with the corresponding coordinates used to generate the data, in order to create Simulated Data 125. This Simulated Data 125 can be used to augment the real-world Signal Data 105, in order to generate more robust models.

The Aggregation Component 127 is used to aggregate the real-world Signal Data 105 and the Simulated Data 125 into a single aggregated data set. The Training Component 130 generally receives the aggregated data (e.g., including the Signal Data 105 and Simulated Data 125), and uses this aggregate data set to train or refine one or more ML Models 135. In one embodiment, this includes training a model to receive signal information as input (e.g., RSSIs from one or more beacons), and return coordinates, orientation, and/or movement actions as output. In at least one embodiment, as new real-world data is received during runtime (e.g., received signal strengths a user device is receiving from beacons), the Training Component 130 evaluates it to automatically label it, as discussed in more detail below. This new data can then similarly be used to train or refine the ML Models 135, ensuring a comprehensive data set with minimal (or zero) manual curation.

Figure 3A:
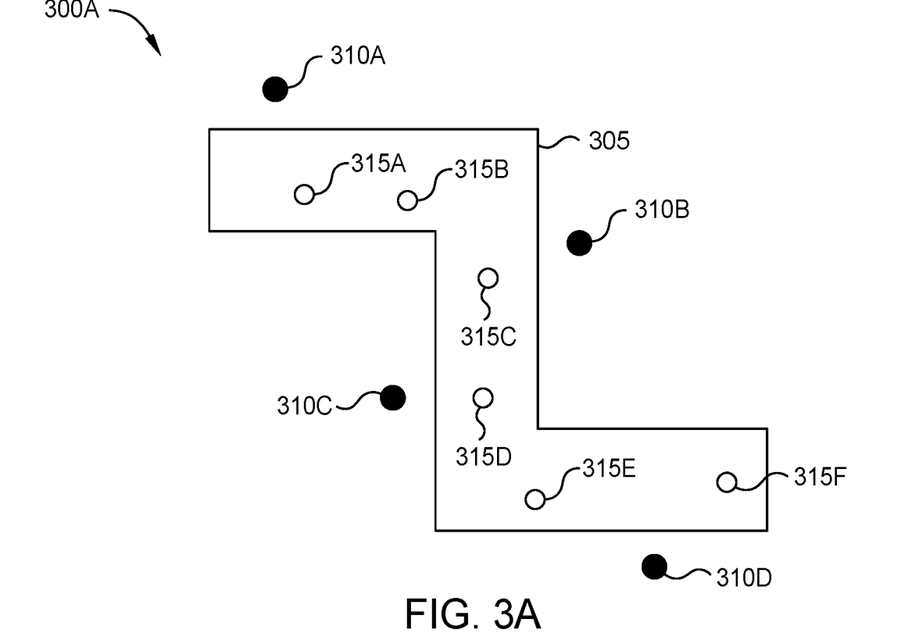
FIGS. 3A and 3B depict collection and evaluation of data in a real-world environment to generate and train models, according to one embodiment disclosed herein.
Figure 3B:
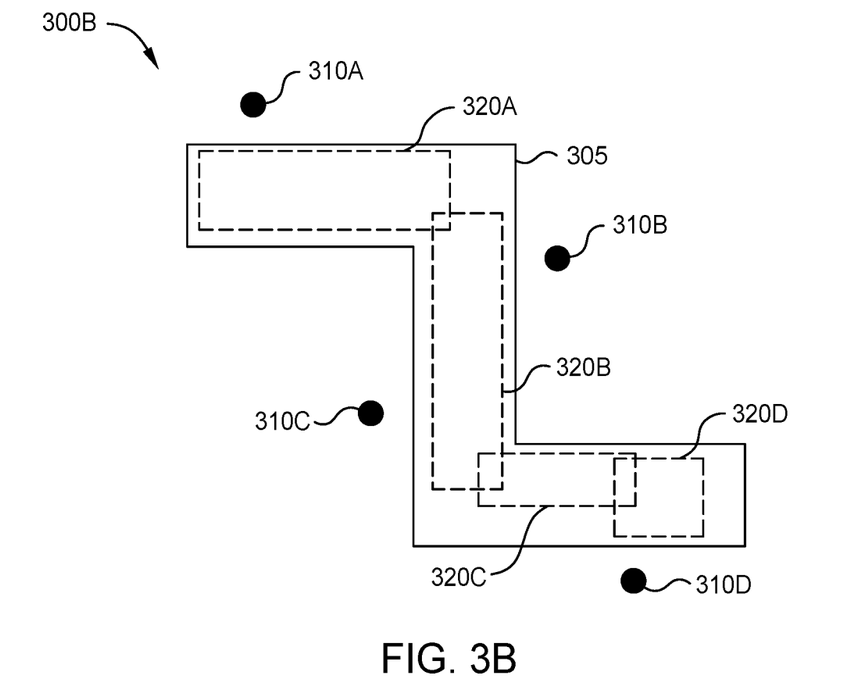

FIGS. 3A and 3B depict collection and evaluation of data in a real-world environment to generate trained models, according to one embodiment disclosed herein. As depicted in diagram 300A in FIG. 3A, a number of Beacons 310A-D are installed in a physical Environment 305. In embodiments, the Environment 305 may be an indoor or outdoor space, and may include any number and arrangement of rooms, hallways, obstacles, walls, paths, and the like. In an embodiment, each Beacon 310 is a device configured to transmit wireless signals that can be used for localization. In some embodiments, the Beacons 310 transmit a unique identifier of the beacon. In at least one embodiment, each Beacon 310 transmits a hierarchical identifier that can be used to uniquely identify the beacon. For example, the transmission may include an indication of a broader location of the Beacon 310 (e.g., the floor number on which the Beacon 310 is installed, the room the Beacon 310 is in, and the like), as well as a unique identifier within that broader location.

In embodiments, the Learning System 205 stores (or has access to) records indicating the install location of each Beacon 310. In one embodiment, a coordinate system is defined for the physical Environment 305 (e.g., with the origin placed at the northwest corner of the space), and the coordinate location of each Beacon 310 is recorded. For example, Beacon 310A may be located at position (2, 0), while Beacon 310C is located at (4, 8). In the illustrated embodiment, signal data has been collected at a variety of Positions 315A-F. This data can be collected, for example, by a user walking through the Environment 305 with a sensor capable of receiving the signals from the Beacons 310.

The Signal Data 105 can include the coordinates at which the data was collected (e.g., the coordinates of the Position 315A-F where the device was when the signals were recorded), as well as identifier(s) of each Beacon 310A-D from which signals were received at the location, and the received signal strength of each Beacon 310A-D. In one embodiment, the data further includes the orientation of the sensor device and/or person using the device (e.g., North, South, East, West, Northeast, and the like). In one such embodiment, the real-world data includes records including information about the space, where each record R takes the form of R=[$(x_i, y_i)$, O, [$B_1, B_2, \ldots B_n$]], where ($x_i, y_i$) is the coordinate position at which the signals were received, O is the orientation of the device when the signals were received, and [$B_1, B_2, \ldots B_n$] is the set of Beacons 310A-D from which data was received. In a further embodiment, for each beacon 310A-D, $B_i$=[$RSSI_i$, $MajorID_i$, $MinorID_i$, $UUID_i$], the data consists of an RSSI value and the beacon's identifiers, where $RSSI_i$ is the received signal strength, $UUID_i$ is a broad indication of the location of the beacon (e.g., building where the beacon is installed), $MajorID_i$ is an indication of a more granular location (e.g., the floor), and $MinorID_i$ is an indication of an even more granular location (e.g., the room in which it is installed).

In this way, the Learning System 205 can evaluate the signal data to determine the relative signal quality at each recorded Position 315A-F in the space. Although six Positions 315 are depicted, in embodiments, there may be any number of locations where data is collected. In one embodiment, this data is collected continuously (e.g., with a new record created every second) as the user moves through the space. In another embodiment, the user manually creates records by stopping at a position, recording the coordinates, and instructing the sensor device to record the currently-received signals.

As depicted in diagram 300B of FIG. 3B, once signal data is collected, the Learning System 205 analyzes and evaluates the signal data to determine signal quality at each Position 315A-F, and identifies Regions 320A-D of the Environment 305 that have similar signal quality. In one embodiment, the signal quality is defined based on the average signal strength perceived at the location, the number of beacons with acceptable signal strength (e.g., above a defined minimum), the variance of the signal strength over time or at different orientations, and the like. In some embodiments, the Regions 320 may be partially overlapping (e.g., the borders of a region may be soft or flexible). In at least one embodiment, the Learning System 205 only identifies Regions 320 having low signal quality, and does not define other areas. In another embodiment, the system classifies each Region 320 as having high signal quality or low signal quality. In some embodiments, the Learning System 205 can further classify some Regions 320 as having acceptable signal quality.

In embodiments, the classifications for each Region 320 can then be used to augment the data set. For example, the Learning System 205 can generate simulated data for one or more positions in each Region 320 classified as high quality, and recommend additional real-world data collection for one or more positions in each Region 320 classified as low quality. Although the depicted Regions 320 are rectangular, in embodiments, the Regions 320 can be any shape, including circular, or amorphous. Additionally, in some embodiments, rather than identifying and classifying Regions 320, the system classifies individual points or positions in the space.

Figure 4:
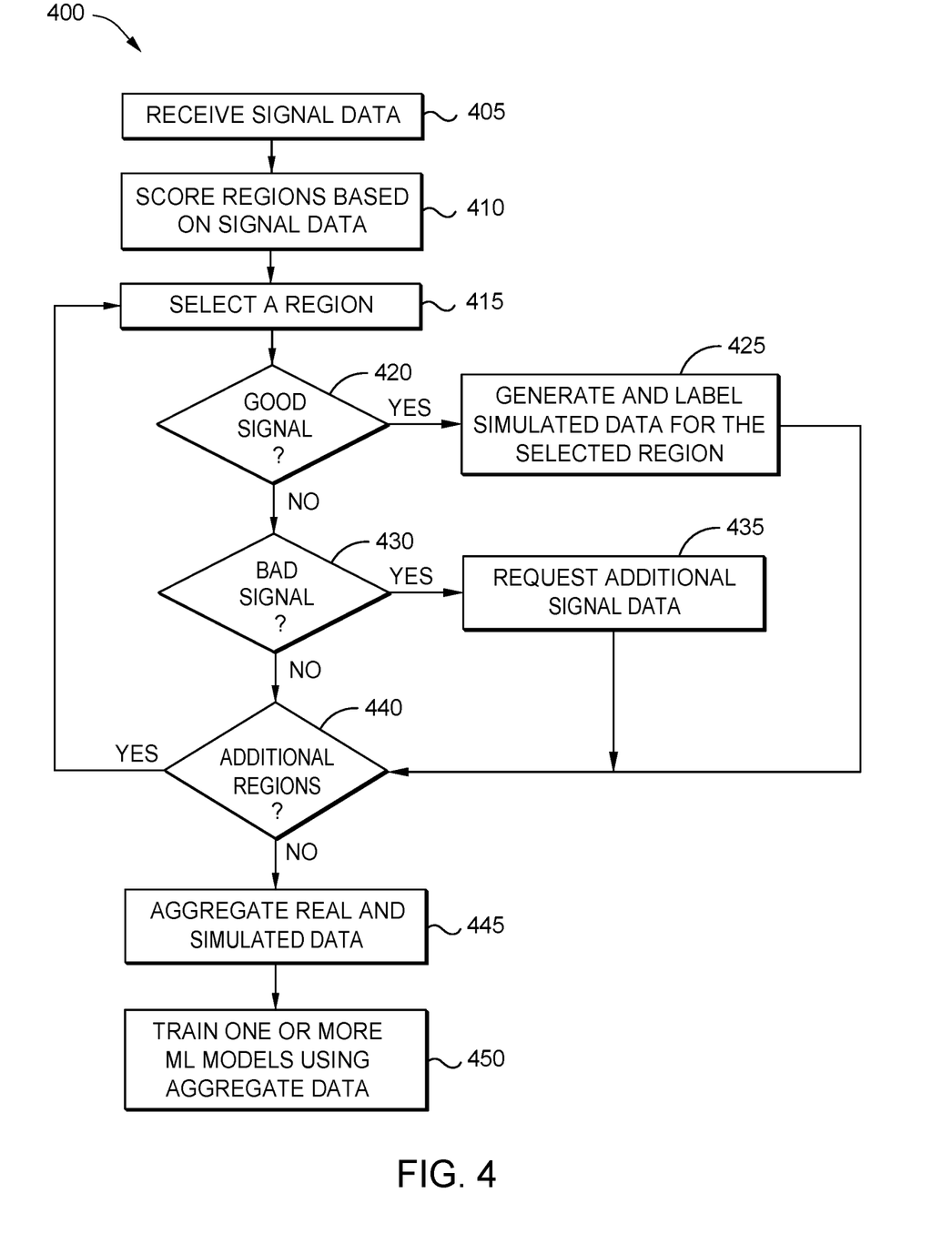
FIG. 4 is a flow diagram illustrating a method for evaluating real-world data and generating simulated data, according to one embodiment disclosed herein.

FIG. 4 is a flow diagram illustrating a method 400 for evaluating real-world data and generating simulated data, according to one embodiment disclosed herein. The method 400 begins at block 405, where a Learning System 205 receives real-world signal data during a training or initialization phase. In one embodiment, this data is manually labeled with the coordinate and/or orientation of the user device at the time the signal strength was recorded. In some embodiments, the data is labeled using data generated by the sensing device (e.g., via inertial sensors). At block 410, the Learning System 205 scores the regions or positions in the physical space, based on the signal quality (as reflected in the received signal data). In one embodiment, this score is a composite metric reflecting the average signal strength from one or more beacons, the number of beacons visible, the variance in signal strength of time, and the like.

The method 400 then proceeds to block 415, where the Learning System 205 selects one of the regions or positions in the space. At block 420, the Learning System 205 determines whether the signal quality at the selected region satisfies one or more predefined criteria, and is therefore classified as good quality. For example, in one embodiment, the criteria can include a minimum number of visible beacons (e.g., a number of beacons with a minimum received signal strength at the location), a minimum average beacon signal strength, a maximum signal variance, and the like. If the selected position is a high quality region, the method 400 proceeds to block 425, where the Learning System 205 generates and labels simulated data for the selected region.

For example, in one embodiment, the Learning System 205 uses a path loss model to estimate signal characteristics at one or more positions in the region, based on the known location of each beacon and the known position in the region. The Learning System 205 can then label this predicted signal data with the selected location or region. The method 400 then proceeds to block 440. Returning to block 420, if the Learning System 205 determines that the selected region is not classified as high quality, the method 400 proceeds to block 430, where the Learning System 205 determines whether the region is low quality, based on one or more criteria.

In an embodiment, the criteria used to classify areas as low quality can correspond to the parameters used to identify high quality regions. For example, the Learning System 205 may evaluate the signal data to determine whether the region has a different (lower) minimum number of visible beacons, a different (lower) minimum signal strength, a different (higher) maximum variance, and the like. If the selected area fails to satisfy the minimum criteria (e.g., because of multipathing, interference, distance from beacons, and the like), the method 400 proceeds to block 435, where the Learning System 205 recommends or requests that additional real-world data be collected in the region. This can help improve the data by gathering additional data points in difficult areas. The method 400 then continues to block 440.

Returning to block 430, if the Learning System 205 determines that the selected region is not a bad quality area (e.g., the signal quality is not high enough to be classified as a good region, but not low enough to be classified as a bad region), the method 400 continues to block 440. At block 440, the Learning System 205 determines whether there is at least one additional region to be analyzed. If so, the method 400 returns to block 415. Otherwise, the method 400 proceeds to block 445. In this way, blocks 415, 420, 425, 430, and/or 435 are repeated for each region or position in the space.

At block 445, the Learning System 205 aggregates the real-world data and simulated data to create an aggregate data set. At block 450, the Learning System 205 then uses this aggregate data set to train or refine one or more ML models. This can include, for example, training a model to receive signal strength data as input and return predicted coordinates and/or orientation as output. In another embodiment, an ML model is trained to return, as output, an instruction or direction to move.

Figure 5:
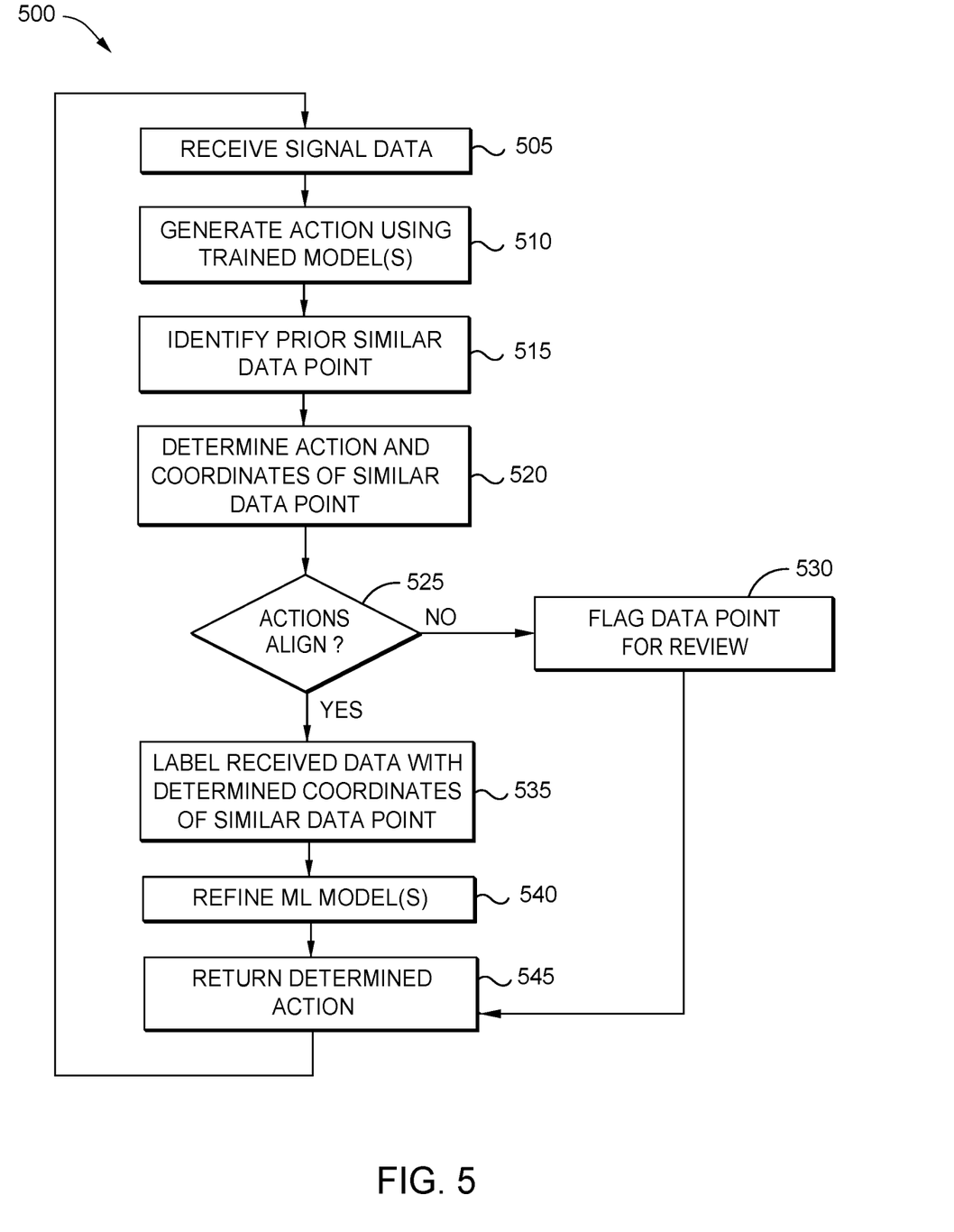
FIG. 5 is a flow diagram illustrating a method for training and refining models using real-world data and simulated data, according to one embodiment disclosed herein.

FIG. 5 is a flow diagram illustrating a method 500 for training and refining models using real-world data and simulated data, according to one embodiment disclosed herein. The method 500 begins at block 505, where the Learning System 205 receives real-world signal data during runtime (e.g., after the method 400 is completed). For example, the Learning System 205 may receive data from a user device as the user moves through the space. In one embodiment, the received data includes the received signal strength for a number of beacons, but does not include the location and/or orientation of the user device.

At block 510, the Learning System 205 generates or determines a next action, by processing the received data with one or more models. For example, in one embodiment, the Learning System 205 uses an imitation learning model which has been trained to mimic an expert user's actions (e.g., a next direction to move) based on the current and/or prior location of the user device (or based on received signal strength from one or more beacons). For example, the imitation learning model can instruct or recommend that the user move one meter East. The method 500 then proceeds to block 515.

At block 515, the Learning System 205 identifies one or more similar data points that were previously recorded. For example, the Learning System 205 may do so by comparing the currently-received signal strengths to previous records in the aggregate data set (which can include both real-world data collected during a training phase, as well as simulated data). In one embodiment, the Learning System 205 can use one or more algorithms such as K-nearest neighbor to identify the prior records which are most similar to the current data. The method 500 then continues to block 520, where the Learning System 205 determines the action and/or coordinates indicated by the identified similar data point.

That is, in an embodiment, each of the prior data points includes the coordinate location of the device, as discussed above. In another embodiment, the prior record further indicates the action that was taken (or was recommended to be taken). For example, the action can indicate the direction in which the user moved. The Learning System 205 can retrieve this information from the similar data point, in order to evaluate and label the newly-received data without requiring manual curation. At block 525, the Learning System 205 determines whether the previous action (reflected in the prior similar data point) and the currently-generated action (generated in block 510) align. That is, the Learning System 205 determines whether the newly-generated action matches the prior-recommended action (e.g., the direction is the same or within a predefined difference threshold).

If not, the method 500 continues to block 530, where the Learning System 205 flags the newly-received data point for manual review. For example, the Learning System 205 may determine that a user should review the newly-received signal data to determine the appropriate action to take. Once the data has been manually labeled, it can be added to the aggregate training set and used to train or refine one or more models (e.g., to improve the imitation learning system). The method 500 then continues to block 545.

Returning to block 525, if the Learning System 205 determines that the actions align, the method 500 continues to block 535, where the Learning System 205 labels the newly-received data with the determined coordinates and/or action of the prior similar data point. That is, the Learning System 205 generates a record indicating the prior coordinate location, and the currently-received signal data (e.g., signal strengths). In this way, the Learning System 205 can continuously generate and label new training data based on the prior data, without requiring any manual review or curation. The method 500 then continues to block 540, where the Learning System 205 adds this newly created data to the aggregate set, and trains or refines the ML models (e.g., the imitation learning system). The method 500 then continues to block 545.

At block 545, the Learning System 205 returns the determined action (e.g., generated at block 510, and/or determined at block 520) to the user device that provided the signal data in block 505. In this way, the user can be instructed to move in one or more directions. Upon doing so, in an embodiment, the user device can collect new signal data at the new location, and transmit it to the Learning System 205, thus beginning the method 500 anew.

Figure 6:
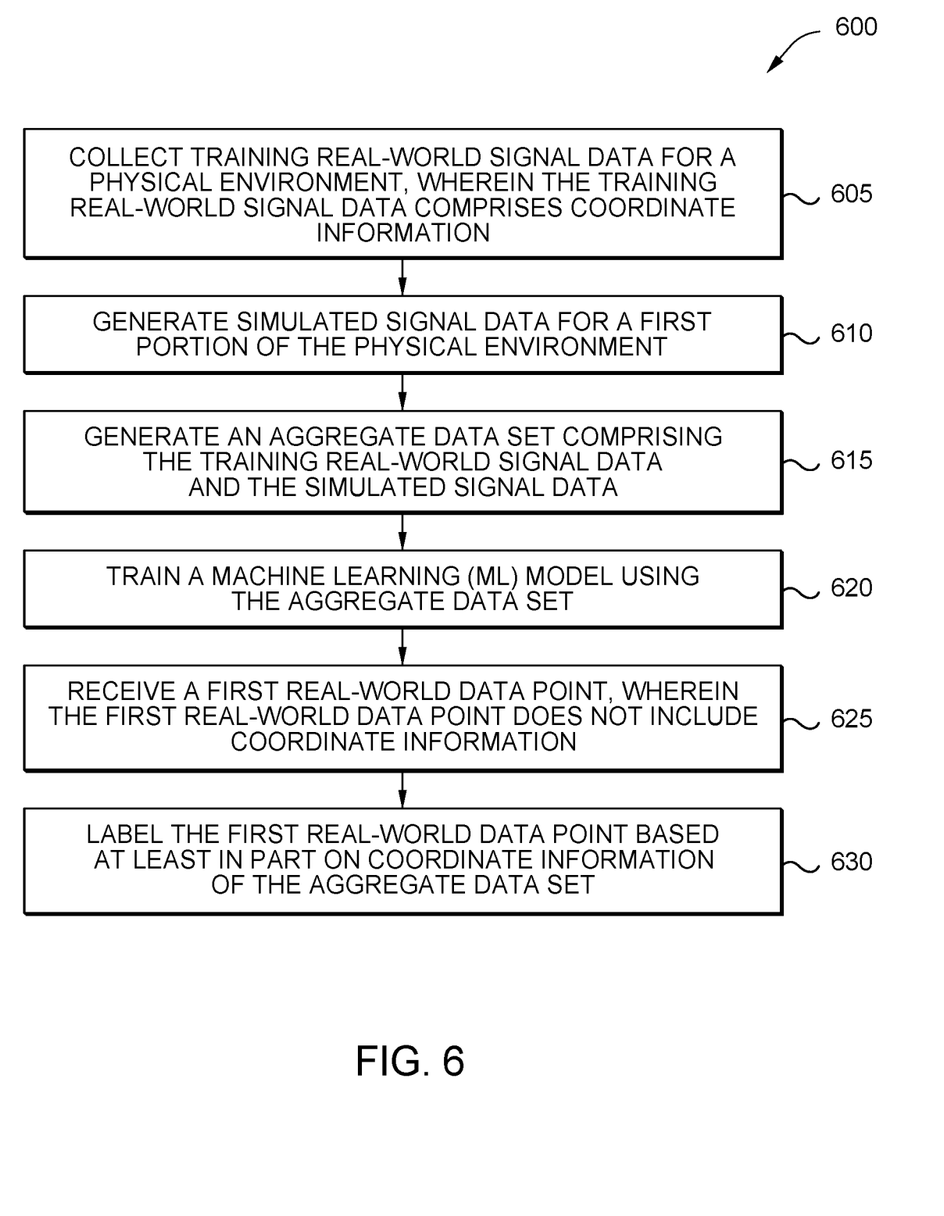
FIG. 6 is a flow diagram illustrating a method for integrating real-world and simulated data to improve models, according to one embodiment disclosed herein.

FIG. 6 is a flow diagram illustrating a method 600 for integrating real-world and simulated data to improve models, according to one embodiment disclosed herein. The method 600 begins at block 605, where a Learning System 205 collects training real-world signal data for a physical environment, wherein the training real-world signal data comprises coordinate information. In some embodiments, the training real-world signal data can also or alternatively include a direction in which the user should and/or did move. At block 610, the Learning System 205 generates simulated signal data for a first portion of the physical environment. The method 600 then continues to block 615, where the Learning System 205 generates an aggregate data set comprising the training real-world signal data and the simulated signal data. Further, at block 620, the Learning System 205 trains a machine learning (ML) model using the aggregate data set. The method 600 then proceeds to block 625, where the Learning System 205 receives a first real-world data point, wherein the first real-world data point does not include coordinate information. At block 630, the Learning System 205 labels the first real-world data point based at least in part on coordinate information of the aggregate data set.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding and/or following, reference is made to embodiments presented in this disclosure. However, the scope of the present disclosure is not limited to specific described embodiments. Instead, any combination of the preceding and/or following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding and/or following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Learning Application 235) or related data available in the cloud. For example, the Learning Application 235 could execute on a computing system in the cloud and evaluate signal data. In such a case, the Learning Application 235 could generate simulated data for some portions of the environment, and automatically label new data using the prior data points. The Learning Application 235 could further store the aggregate signal data and models at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
   collecting training real-world signal data for a physical environment, wherein the training real-world signal data comprises at least one of (i) coordinate information or (ii) a direction to move;
   in response to classifying a first region of the physical environment as having high signal quality, based on determining that real-world signal data for the first region satisfies a first set of criteria, generating simulated signal data for the first region, wherein:
      classifying the first region of the physical environment as having high signal quality comprises:
         selecting a subset of the training real-world signal data that was collected in the first region of the physical environment; and
         evaluating the subset of the training real-world signal data to determine that the subset of the training real-world signal data satisfies the first set of criteria, and
      the first set of criteria comprises at least one member selected from a group consisting of (i) a minimum number of beacons reflected in the subset of the training real-world signal data, (ii) a minimum average signal strength reflected in the subset of the training real-world signal data, and (iii) a maximum signal variance reflected in the subset of the training real-world signal data;
   in response to classifying a second region of the physical environment as having poor signal quality, based on determining that real-world signal data for the second region fails to satisfy a second set of criteria:
      refraining from generating simulated signal data for the second region; and
      requesting additional training real-world signal data from the second region;
   in response to classifying a third region of the physical environment as having adequate signal quality, based on determining that real-world signal data for the third region fails to satisfy the first set of criteria and satisfies the second set of criteria:
      refraining from generating simulated signal data for the third region; and
      refraining from requesting additional training real-world signal data from the third region;
   generating an aggregate data set comprising the training real-world signal data and the simulated signal data;
   training a machine learning (ML) model using the aggregate data set;
   receiving, at runtime, a first real-world data point, wherein the first real-world data point does not include coordinate information;
   labeling the first real-world data point based at least in part on coordinate information of the aggregate data set;
   generating a next direction to move by evaluating the first real-world data point using the trained ML model; and
   returning the next direction to move to a device that transmitted the first real-world data point.

2. The method of claim 1, wherein generating the aggregate data set comprises labeling the simulated signal data based at least in part on the coordinate information of the training real-world signal data.

3. The method of claim 1, wherein generating the simulated signal data comprises computing predicted signal values using one or more path loss models that predict signal characteristics of sensing devices.

4. The method of claim 1, wherein labeling the first real-world data point comprises:
   identifying a similar data point in the aggregate data set, based on signal strength information included in the aggregate data set and the first real-world data point; and determining a coordinate indicated by the similar data point, wherein the labeled first real-world data point is added to the aggregate data set.

5. One or more computer-readable storage media collectively containing computer program code that, when executed by operation of one or more computer processors, performs an operation comprising:
  collecting training real-world signal data for a physical environment, wherein the training real-world signal data comprises at least one of (i) coordinate information or (ii) a direction to move;
  in response to classifying a first region of the physical environment as having high signal quality, based on determining that real-world signal data for the first region satisfies a first set of criteria, generating simulated signal data for the first region, wherein:
    classifying the first region of the physical environment as having high signal quality comprises:
      selecting a subset of the training real-world signal data that was collected in the first region of the physical environment; and
      evaluating the subset of the training real-world signal data to determine that the subset of the training real-world signal data satisfies the first set of criteria, and
    the first set of criteria comprises at least one member selected from a group consisting of (i) a minimum number of beacons reflected in the subset of the training real-world signal data, (ii) a minimum average signal strength reflected in the subset of the training real-world signal data, and (iii) a maximum signal variance reflected in the subset of the training real-world signal data;
  in response to classifying a second region of the physical environment as having poor signal quality, based on determining that real-world signal data for the second region fails to satisfy a second set of criteria:
    refraining from generating simulated signal data for the second region; and
    requesting additional training real-world signal data from the second region;
  in response to classifying a third region of the physical environment as having adequate signal quality, based on determining that real-world signal data for the third region fails to satisfy the first set of criteria and satisfies the second set of criteria:
    refraining from generating simulated signal data for the third region; and
    refraining from requesting additional training real-world signal data from the third region;
  generating an aggregate data set comprising the training real-world signal data and the simulated signal data;
  training a machine learning (ML) model using the aggregate data set;
  receiving, at runtime, a first real-world data point, wherein the first real-world data point does not include coordinate information;
  labeling the first real-world data point based at least in part on coordinate information of the aggregate data set;
  generating a next direction to move by evaluating the first real-world data point using the trained ML model; and
  returning the next direction to move to a device that transmitted the first real-world data point.

6. The computer-readable storage media of claim 5, wherein generating the aggregate data set comprises labeling the simulated signal data based at least in part on the coordinate information of the training real-world signal data.

7. The computer-readable storage media of claim 5, wherein generating the simulated signal data comprises computing predicted signal values using one or more path loss models that predict signal characteristics of sensing devices.

8. The computer-readable storage media of claim 5, wherein labeling the first real-world data point comprises:
  identifying a similar data point in the aggregate data set, based on signal strength information included in the aggregate data set and the first real-world data point; and
  determining a coordinate indicated by the similar data point, wherein the labeled first real-world data point is added to the aggregate data set.

9. A system comprising:
  one or more computer processors; and
  one or more memories collectively containing one or more programs which when executed by the one or more computer processors performs an operation, the operation comprising:
    collecting training real-world signal data for a physical environment, wherein the training real-world signal data comprises at least one of (i) coordinate information or (ii) a direction to move;
    in response to classifying a first region of the physical environment as having high signal quality, based on determining that real-world signal data for the first region satisfies a first set of criteria, generating simulated signal data for the first region, wherein:
      classifying the first region of the physical environment as having high signal quality comprises:
        selecting a subset of the training real-world signal data that was collected in the first region of the physical environment; and
        evaluating the subset of the training real-world signal data to determine that the subset of the training real-world signal data satisfies the first set of criteria, and
      the first set of criteria comprises at least one member selected from a group consisting of (i) a minimum number of beacons reflected in the subset of the training real-world signal data, (ii) a minimum average signal strength reflected in the subset of the training real-world signal data, and (iii) a maximum signal variance reflected in the subset of the training real-world signal data;
    in response to classifying a second region of the physical environment as having poor signal quality, based on determining that real-world signal data for the second region fails to satisfy a second set of criteria:
      refraining from generating simulated signal data for the second region; and
      requesting additional training real-world signal data from the second region;
    in response to classifying a third region of the physical environment as having adequate signal quality, based on determining that real-world signal data for the third region fails to satisfy the first set of criteria and satisfies the second set of criteria:
      refraining from generating simulated signal data for the third region; and
      refraining from requesting additional training real-world signal data from the third region;

generating an aggregate data set comprising the training real-world signal data and the simulated signal data;

training a machine learning (ML) model using the aggregate data set;

receiving, at runtime, a first real-world data point, wherein the first real-world data point does not include coordinate information;

labeling the first real-world data point based at least in part on coordinate information of the aggregate data set;

generating a next direction to move by evaluating the first real-world data point using the trained ML model; and returning the next direction to move to a device that transmitted the first real-world data point.

10. The system of claim 9, wherein generating the aggregate data set comprises labeling the simulated signal data based at least in part on the coordinate information of the training real-world signal data.

11. The system of claim 9, wherein generating the simulated signal data comprises computing predicted signal values using one or more path loss models that predict signal characteristics of sensing devices.

12. The system of claim 9, wherein labeling the first real-world data point comprises:

identifying a similar data point in the aggregate data set, based on signal strength information included in the aggregate data set and the first real-world data point; and determining a coordinate indicated by the similar data point, wherein the labeled first real-world data point is added to the aggregate data set.

* * * * *